United States Patent Office 3,027,263
Patented Mar. 27, 1962

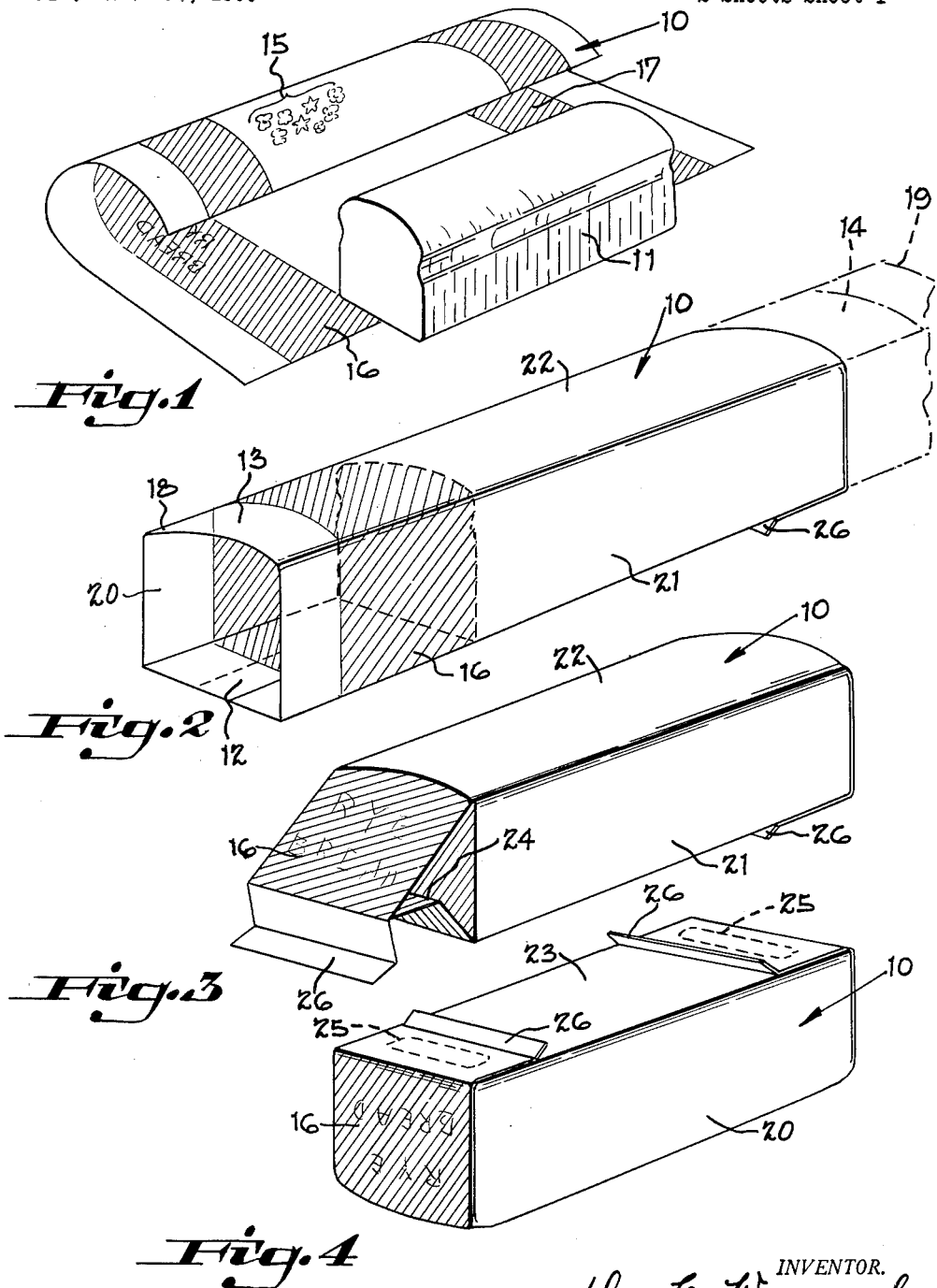

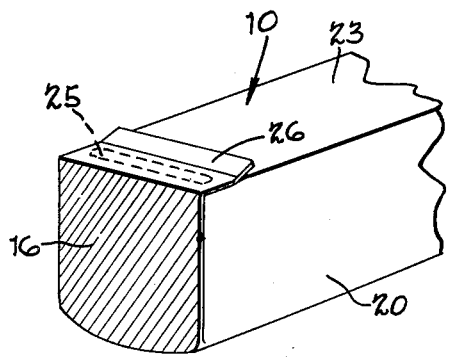
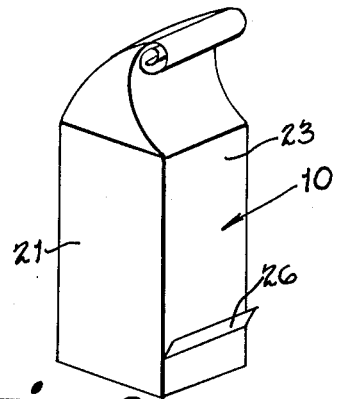
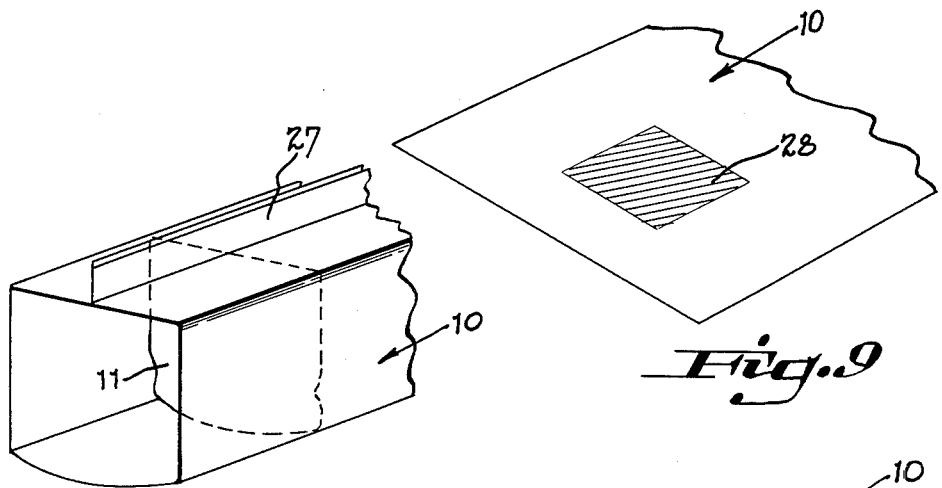
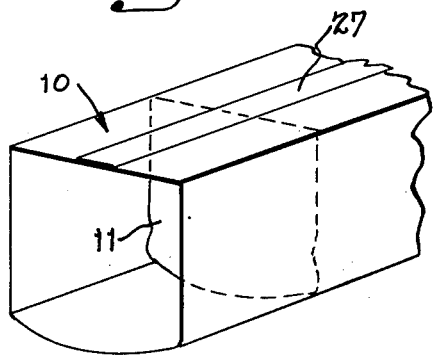
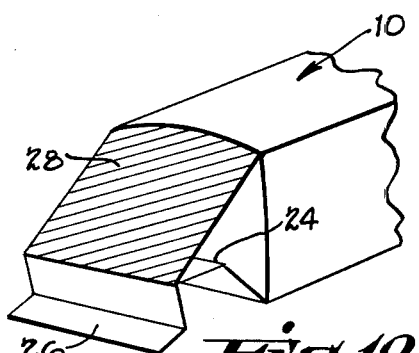

3,027,263
METHOD OF FOLDING AND SEALING A BREAD WRAPPER
Don E. Wanamaker, 4606 Owens Drive, Dayton, Ohio
Filed Nov. 10, 1958, Ser. No. 772,844
2 Claims. (Cl. 99—172)

This invention relates to an improved bread wrapper and a novel method of folding and sealing the wrapper about a loaf of bread.

For the purposes of this disclosure the invention is illustrated and described in relation to the use of cellophane in the wrapping of pre-sliced loaves of bread. It will be apparent, however, that the invention is not limited in utility to the wrapping of this particular commodity, nor is it limited to a specific type of transparent wrapping material.

Cellophane is used by bakeries to wrap bread primarily because bread so wrapped is clearly visible to purchasers, and it has been determined that bread which may be viewed through its wrapper has more sales appeal than bread in a non-transparent wrapper such as waxpaper. However, the inherent filimsiness of cellophane creates problems in its use as a wrapping material. In the past, it has been the practice to utilize a waxpaper center-band with cellophane, this center-band enclosing a substantial length of the central portion of the loaf of bread and serving to retain, more or less, the shape of the sliced loaf within the wrapper. Despite the use of a center-band, sliced loaves utilizing such a wrapping have had to be handled with care. For example, it is practically impossible to pick up such a loaf by grasping it at one end in the area unsupported by the center-band without the sliced loaf becoming deformed, since the slices slide with respect to one another within the wrapper.

Hence, one of the objectives of the present invention is to provide a transparent wrapping which may be made of a filimsy transparent material such as cellophane, but which does not require the use of a center band; and, furthermore, one which prevents deformation of the loaf when it is picked up by one end.

The conventional practice in the wrapping of bread in cellophane is to seal in the loaf by forming a so-called "four corner fold" at each end. In this fold, portions of the wrapper which initially project slightly beyond the ends of the loaf are folded over from the top, the bottom and the two sides. The excess wrapping material after folding is simply flattened, leaving a wrinkled, uneven surface at each end of the loaf. Due to the large amount of bread sold in supermarkets, wherein the loaves are stacked one on top of the other with only one end of each loaf exposed, the appearance of the ends of bread wrappers has become of paramount importance, because this is generally the only portions of a wrapper exposed to purchasers. In order to partially hide the wrinkled, uneven ends, it has become common practice for bakeries to utilize "pasters," which are merely labels, much smaller than the overall area at an end of a loaf of bread, which are pasted over the ends of loaves of bread. These pasters or labels serve the additional functions of providing advertising space and they aid somewhat in the sealing of the ends of the wrapper.

The four fold end seal with paster label is not entirely satisfactory from the viewpoint of a bakery, becasue the labels are small and can carry only a limited amount of identification or advertising material. This type of end seal has an even more serious objection from the viewpoint of the consumer, because it makes it difficult for the consumer to open the loaf of bread, and once it has been opened, the end cannot be resealed unless a large number of slices are removed at once to free enough wrapping material to permit folding.

The wrapper of this invention eliminates the end seals altogether and it provides in their places comparatively large identification panels which completely cover the ends of the loaf of bread, thus satisfying the need of the bakery for larger end areas to carry advertising material. More importantly, however, from the viewpoint of the consumer, it provides a unique flip-open end which solves the opening difficulties of prior wrappings. This flip-open end also provides a substantially long sleeve which can be rolled or folded up to reseal the end of the loaf once it has been opened. This last factor is highly advantageous, inasmuch as it preserves the freshness of the opened loaf for long periods, and this factor is particularly important in Southern areas of the United States, because the resealed package is not only air-tight and moisture proof, but it is insect proof as well.

Another objective of the invention is to provide a transparent bread wrapping which is less expensive than the transparent wrappings currently available. The wrapping of this invention utilizes more cellophane than is presently used, but no center-band is required, nor are the two labels presently used at the ends required, and the savings through the elimination of the center-band and labels are considerably greater than the cost of the additional cellophane.

In the preferred embodiment of the invention, the cellophane of the present wrapper is formed into a sleeve which encloses the sides of the sliced loaf of bread. Prior to forming the end seals substantially long extensions of the sleeve project beyond the two ends of the loaf. To enclose and seal the ends, the extensions are first folded to provide flat sleeves which are no wider than the width of the loaf of bread. The folding then progresses to form a flat, smooth panel down over each end of the loaf, which is equal in area to the end of the loaf, plus a tab which folds under the end of the loaf where it is secured by means such as a spot of adhesive. The seal thus provided is air tight. Hence, the bread stays fresher longer. In the flattening of the sleeve in order to enclose an end of the loaf of bread, an end panel is provided which has a number of thicknesses of cellophane material in it. This provides stability for the end of the loaf of bread. The very nature of the type of fold which is utilized, compresses the sliced loaf to a slight extent in its endwise direction, and this compression is maintained within the sealed wrapper which prevents the shifting of one slice with respect to another during the course of ordinary handling.

In substance, therefore, it may be seen that the present wrapper has many advantages over current wrappers including the flip-open and resealing features which concern the consumer and the savings in cost and identification panel features which concern the bakery.

Other objectives and advantages of the present invention will be readily apparent to those skilled in the art from the following detailed description of the drawings, in which:

FIGURE 1 is a perspective view of a bread wrapper incorporating the principles of the invention showing it in conjunction with a loaf of bread about which it is to be wrapped.

FIGURE 2 is a diagrammatic perspective view showing the wrapper on a loaf of bread with one end sealed and one end open.

FIGURE 3 is a view similar to FIGURE 2 illustrating the manner in which the wrapper is folded to enclose the end of a loaf of bread.

FIGURE 4 is an inverted perspective view of a wrapped loaf of bread illustrating the tabs which are pulled to flip open the wrapper.

FIGURE 5 is an inverted perspective view showing one end only of a wrapped loaf of bread in which less material is folded underneath the end of the loaf than that shown in FIGURE 4.

FIGURE 6 is a perspective view showing a partially used loaf of bread resealed in the wrapper.

FIGURE 7 is an inverted, fragmentary, partially diagrammatic perspective view showing a modified method of sealing the wrapper around a loaf of bread.

FIGURE 8 is a view similar to FIGURE 7 illustrating the next step in the modified method.

FIGURE 9 is a fragmentary perspective view of a wrapper incorporating a prepared identification panel.

FIGURE 10 is a fragmentary perspective view of the form of the invention disclosed in FIGURE 9 as it appears while being folded around the end of a loaf of bread.

A wrapper made in accordance with the present invention is designated by the numeral 10 in the drawings. As shown in FIGURE 1, the wrapper consists of a rectangular sheet of transparent material such as cellophane. The sheet is sufficiently wide from side to side to enclose the sides of a loaf of bread 11 with a slight overlap as shown at 12, which preferably is positioned at the bottom of the loaf. The sheet is long enough so that when it is wrapped around the loaf, substantially long sleeve portions 13—14 are provided, these sleeve portions projecting beyond the opposite ends of the loaf by an amount which is greater than the height of the loaf.

The wrapper sheet may be decorated in various ways for identification and advertising purposes, including an all-over printed pattern as suggested at 15. For example, colored bands such as those designated 16 and 17 may extend across each sheet, each of these bands being as wide as the height of the loaf of bread to be wrapped and being spaced inwardly from the ends to provide two free edgewise areas 18 and 19, the purpose of these free edgewise areas being explained below. The bands may be printed upon the wrapper, however, they may be formed integrally with it if desired. In any event, when a loaf of bread is enclosed within the wrapper a part of each band is exposed at the opposite ends of the loaf, these parts providing identification or display panels. The suggested treatment for the bands is to utilize a background color which is solid and then overprint this color with a bakery trade mark or some identifying phrase such as the phrase "rye bread" shown in the drawings.

In actual practice, the wrapping of a loaf of bread in the wrapper of this invention will be accomplished by machine. Steps in the wrapping process are illustrated progressively in FIGURES 1 through 4. Thus, in FIGURE 1 the loaf of bread 11, which is pre-sliced as shown, is placed upon an edge of the wrapper between the two bands 16 and 17. The loaf of bread is then enclosed in the wrapper with the side edges of the wrapper sheet overlapping as at 12. These overlapped edges may be secured by a heat seal, by adhesive or other known means, which provides an elongated sleeve with the loaf centered within the sleeve and the two substantially long sleeve portions extending beyond the ends of the loaf. One such sleeve portion is illustrated in FIGURE 2. In the next step, the sides 20 and 21 of the extended sleeve portions at both ends of the loaf are tuck-folded inwardly so that the sleeve portions are flattened, with the tops 22 thereof contacting the bottoms 23 thereof. At this time the bottoms of each flattened sleeve is folded along a line 24 which extends across the center of the band area such that the bottom 23 may be doubled up against the end of the loaf. At the same time, both flattened sleeve portions are drawn down and in against the ends of the loaf to cover the ends with the printed band areas and to compress the bread slightly between them. As the flattened sleeve portion is drawn down and in against the loaf, the wrapper is placed in tension and such tensioning of the wrapper is responsible for the compression of the loaf. The free edgewise areas to the outside of the printed band areas are drawn underneath the loaf, and each is heat sealed or fastened by means of adhesive to the wrapper at the bottom of the loaf as indicated at 25. The very outermost extension of each of the edgewise areas are not so fastened, and they provide tabs 26 which may be grasped by the consumer to break the seal at 25 and thus open the sleeve for removal of the desired number of slices of bread.

In FIGURE 4 a substantial amount of material of the wrapper is doubled around to the underside over the loaf. A lesser amount may be so doubled over as shown in FIGURE 5 if desired. Additionally, the transverse edges at the ends of the wrapper may be strengthened by doubling over the material along these edges if desired. This prevents tearing and it also assists in the resealing or rewrapping of a partially used loaf, by doubling over or rolling the open sleeve, as shown in FIGURE 6.

In the modification of the invention shown in FIGURES 7 through 10, the loaf of bread is initially enclosed within the wrapper by bringing the longitudinal edges of the wrapper together in facial contact as shown at 27 in FIGURE 7 instead of having these edges overlap as shown in FIGURE 2. Additionally, in this modification the bands are not employed. Instead, each wrapper carries a rectangular imprint 28 in the area thereof which is exposed at the end of the closed wrapper. This is shown in FIGURE 10. Otherwise the folding of the wrapper to enclose a loaf of bread proceeds as previously described.

Having described my invention, I claim:

1. A method of sealing a wrapper around a sliced loaf of bread comprising the steps of providing a rectangular sheet of transparent plastic material, said sheet being substantially longer than the length plus twice the height of the loaf to be wrapped, said sheet being slightly wider than the girth of said loaf, said sheet having two advertising indicia areas thereon each of which is at least as large as the end of said loaf, each of said areas being spaced apart for a distance not substantially greater than the length of the loaf to be wrapped and an equal distance from the center of said sheet, both of said areas being intersected by a pair of lines parallel to the side edges of said rectangular sheet, centering said loaf longitudinally upon the wrapper and wrapping said wrapper around said loaf to provide an overlap of the side edges of said rectangular sheet, sealing the mating edges of said overlap leaving substantially long sleeves of said sheet material projecting beyond the two ends of said loaf with one of said advertising indicia areas being positioned on the upper portion of said of said projecting sleeves, folding said sleeves downwardly and flattening them against the ends of said loaf by collapsing the sides of said sleeves inwardly so that portions of said collapsed sleeves extend below the bottom of said loaf, folding said extended portions of said flattened sleeves underneath the ends of the loaf while maintaining a tensioning force on the wrapper to compress said slices and to provide flat advertising panels at each end of the loaf, sealing a portion of said underlying sleeve portions to the bottom of said loaf, and leaving a portion of each of said underlying sleeve portions free so as to provide pull tabs to open said wrapping.

2. A method of sealing a wrapper around a sliced loaf of bread comprising the steps of providing a rectangular sheet of transparent plastic material, said sheet being substantially longer than the length plus twice the height of the loaf to be wrapped, said sheet being slightly wider than the girth of said loaf, said sheet having two advertising indicia areas thereon, each of said areas being spaced apart for a distance not substantially greater than the length of the loaf to be wrapped and an equal distance from the center of said sheet, centering said loaf longitudinally upon the wrapper and wrapping said wrapper around said loaf to provide an overlap of the side edges of said rectangular sheet, sealing the mating edges of said overlap leaving substantially long sleeves of said sheet material projecting beyond the two ends of said loaf with one of said advertising indicia areas being positioned on the upper portion of each of said projecting sleeves, folding said sleeves downwardly and flattening them against the ends of said loaf by collapsing the sides of said sleeve inwardly so that portions of said collapsed sleeves extend below the bottom of said loaf, folding said extended portions of said flattened sleeves underneath the ends of the loaf while maintaining a tensioning force on the wrapper to compress said slices and to provide flat advertising panels at each end of the loaf, and sealing a portion of said underlying sleeve portions to the bottom of said loaf.

References Cited in the file of this patent
UNITED STATES PATENTS

| | | |
|---|---|---|
| D. 97,010 | Lake | Sept. 24, 1935 |
| D. 139,211 | Lake | Oct. 24, 1944 |
| 2,602,276 | Campbell | July 8, 1952 |

UNITED STATES PATENT OFFICE
CERTIFICATE OF CORRECTION

Patent No. 3,027,263                     March 27, 1962

Don E. Wanamaker

It is hereby certified that error appears in the above numbered patent requiring correction and that the said Letters Patent should read as corrected below.

Column 4, line 46, for "said", first occurrence, read -- each --.

Signed and sealed this 10th day of July 1962.

(SEAL)
Attest:

ERNEST W. SWIDER
Attesting Officer

DAVID L. LADD
Commissioner of Patents